United States Patent [19]

Crupi, Jr.

[11] Patent Number: 4,815,915
[45] Date of Patent: Mar. 28, 1989

[54] UNDER-VEHICLE TOWING APPARATUS

[76] Inventor: Theodore P. Crupi, Jr., 185 Lamberts La., Staten Island, N.Y. 10314

[21] Appl. No.: 76,359

[22] Filed: Jul. 22, 1987

[51] Int. Cl.$^4$ .............................................. B60P 3/12
[52] U.S. Cl. .................................... 414/563; 280/402
[58] Field of Search ......................... 414/563; 280/402

[56] References Cited

U.S. PATENT DOCUMENTS

| | | | |
|---|---|---|---|
| 2,283,443 | 5/1942 | Klein | 212/142 |
| 2,551,745 | 5/1951 | Hutchings | 214/86 |
| 2,603,370 | 7/1952 | Hanzel | 214/86 |
| 2,625,279 | 1/1953 | Dalby et al. | 414/563 |
| 2,715,470 | 8/1955 | Marcus et al. | 214/86 |
| 2,951,601 | 9/1960 | Castoe | 214/86 |
| 3,152,814 | 10/1964 | Wegener et al. | 280/479 |
| 3,313,432 | 4/1967 | Sheldrew | 414/563 X |
| 3,667,631 | 6/1972 | Bishop | 214/86 |
| 3,700,125 | 10/1972 | Aquila | 214/86 |
| 3,716,152 | 2/1973 | Sloter | 214/86 |
| 3,794,192 | 2/1974 | Monson | 214/75 |
| 3,929,237 | 12/1975 | Schaedler | 214/86 |
| 4,000,823 | 1/1977 | Aquila | 214/86 |
| 4,264,262 | 4/1981 | LoCodo | 414/563 |
| 4,268,213 | 5/1981 | Obbink | 414/563 |
| 4,384,817 | 5/1983 | Peterson | 414/563 |
| 4,473,237 | 9/1984 | Lind | 280/402 |
| 4,557,496 | 12/1985 | Sill | 280/402 |
| 4,573,857 | 3/1986 | Porter, Sr. et al. | 280/402 X |
| 4,634,337 | 1/1987 | Hamman | 414/563 |
| 4,637,623 | 1/1987 | Bubik | 280/402 |
| 4,674,943 | 6/1987 | Nespor | 280/402 X |
| 4,679,978 | 7/1987 | Holmes et al. | 414/563 |

FOREIGN PATENT DOCUMENTS

| | | | |
|---|---|---|---|
| 2821436 | 11/1979 | Fed. Rep. of Germany | 414/563 |
| 760688 | 11/1956 | United Kingdom | 414/563 |

OTHER PUBLICATIONS

Holmes International Brochure (Publication 85-354).

Primary Examiner—Robert J. Spar
Assistant Examiner—Gary Cundiff
Attorney, Agent, or Firm—Kenyon & Kenyon

[57] ABSTRACT

An apparatus disposed beneath the body of a first motor vehicle adapted to lift a second motor vehicle at least partly from the ground whereby the first motor vehicle can tow the second motor vehicle. The apparatus comprises a first arm disposed below the first motor vehicle adapted to be pivotable about a first pivot point disposed on the frame of the first motor vehicle, the first motor vehicle having a front axle and a rear axle, the first pivot point being located between the front and rear axles, the first arm extending toward the rear of the first motor vehicle and adapted to engage the second motor vehicle to be towed. The apparatus further comprises a force supplying device such as an hydraulic ram, coupled to the first arm and further coupled to the frame of the motor vehicle for providing force to the first arm to move the first arm about the first pivot point, thereby raising an end of the first arm extending toward the rear of the first motor vehicle whereby the second motor vehicle when engaged by the first arm will be at least partly lifted from the ground for towing.

37 Claims, 5 Drawing Sheets

UNDER-VEHICLE TOWING APPARATUS

BACKGROUND OF THE INVENTION

The present invention relates to apparatus for tow a disabled vehicle, and in particular, to towing apparatus which can be mounted conveniently underneath a towing vehicle. With more particularity, the present invention relates to such an under-vehicle towing apparatus which allows the towing vehicle to be used for other purposes, even when a vehicle is being towed. For example, if the apparatus of the present invention is mounted to a conventional pick-up truck, the bed of the pick-up truck is left completely unobstructed for normal hauling purposes, even when a vehicle is being towed. The present invention also may find use in vehicles other than pick-up trucks, for example, underneath vans, utility vehicles and other trucks.

Various under vehicle towing apparatus are known. For example, U.S. Pat. Nos. 3,667,631 to Bishop, 4,557,496 to Sill, 4,473,237 to Lind and 2,715,470 to Marcus et al. show several types of under-vehicle towing apparatus. U.S. Pat. No. 3,667,631 to Bishop shows a hydraulic utility lift for trucks which is mounted beneath the bed of the towing vehicle. The apparatus there shown utilizes a complicated linkage for increasing the ground clearance of the utility lift. In this arrangement and also in the other known arrangements described in the above-mentioned patents, the apparatus disposed beneath the towing vehicle is disposed behind the rear axle of the vehicle. A disadvantage of this known arrangement is that the weight of the lifted towed vehicle is transferred mainly to the rear portion of the towing vehicle. Thus, weight distribution is poor, and a torque is created tending to lift the front end of the towing vehicle. With smaller trucks or trucks that have not been specifically strengthened or having an increased weight capacity, larger forces than can be handled by the rear suspensions of the towing vehicle may be encountered. Accordingly, in all of these known arrangements, if the towing vehicle is a smaller vehicle such as a pick-up truck, it is often necessary that the rear suspension of the vehicle be modified to handle the increased load.

U.S. PatS. No. 4,634,337 and 4,637,623 show other towing apparatus. However, these apparatus, although partially mounted below the vehicle body, are intended for specially modified towing vehicles. A further example of such a specially modified towing vehicle for wrecking work is that shown in a brochure of Holmes International, which is a division of Dover Corporation, and which apparently is also described in U.S. Pat. No. 4,634,337.

U.S. Pat Nos. 4,268,213, 2,603,370, 3,716,152, 2,951,601 and 2,283,443 show other examples of towing apparatus which are mounted in the body of the towing vehicle, for example, in the bed of a pick-up truck. In these known arrangements, the towing apparatus is mounted so that when not in use, it can be collapsed so that it will not interfere with normal usage of the truck bed, for example. However, in these known arrangements, when the towing apparatus is in use, the towing vehicle cannot be used for normal hauling purposes, as the upraised boom of the towing apparatus would interfere with such use.

Other patents which disclose various towing apparatus include U.S. Pat. Nos. 3,929,237, 3,700,125, 3,794,192, 4,000,823, 4,264,262 and 3,152,814 and 2,551,745. In all of these arrangements, the towing apparatus interferes with normal usage of the vehicle body, for example a pick-up truck bed, because the apparatus is mounted in the bed of the pick-up truck.

SUMMARY OF THE INVENTION

It is an object of the present invention to provide an under-vehicle towing apparatus which does not interfere with normal usage of the towing vehicle, even when the towing apparatus is being used to tow a vehicle.

It is furthermore an object of the present invention to provide a relatively simple apparatus which can be mounted beneath the body of a towing vehicle with relatively few modifications.

It is furthermore an object of the present invention to provide such an under-vehicle towing apparatus which provides for relatively equal weight distribution of the weight of the towed vehicle to the front and rear suspensions of the towing vehicle.

It is furthermore an object of the present invention to provide such an under-vehicle towing apparatus which can be mounted to various forms of commercial vehicles, for example, pick-up trucks, flat-bed trucks and conventional vans.

It is yet still another object of the present invention to provide such an under vehicle towing apparatus which can be disposed beneath the bodies of relatively light trucks, for example, pick-up trucks and vans.

The above and other object of the present invention are achieved by an under vehicle towing apparatus comprising an apparatus disposed beneath the body of a first motor vehicle adapted to lift a second motor vehicle at least partly from the ground whereby the first motor vehicle can tow the second motor vehicle, comprising first arm means disposed below the first motor vehicle and adapted to be pivotable about a first pivot point disposed on the frame of the first motor vehicle, the first motor vehicle having a front axle and a rear axle, the first pivot point being located between the front and rear axles, the first arm means extending toward the rear of the first motor vehicle and adapted to engage the second motor vehicle to be towed, and force supplying means coupled to the first arm means and further coupled to the frame of the first motor vehicle for providing a force to the first arm means to move the first arm means about the first pivot point, thereby raising an end of the first arm means extending toward the rear of the first motor vehicle whereby the second motor vehicle when engaged by the first arm means will be at least partly lifted from the ground for towing.

Other objects, features and advantages of the present invention will be apparent from the description which follows.

BRIEF DESCRIPTION OF THE DRAWINGS

The invention will be described in greater detail in the following detailed description with reference to the drawings, in which.

DETAILED DESCRIPTION

Figure 1:
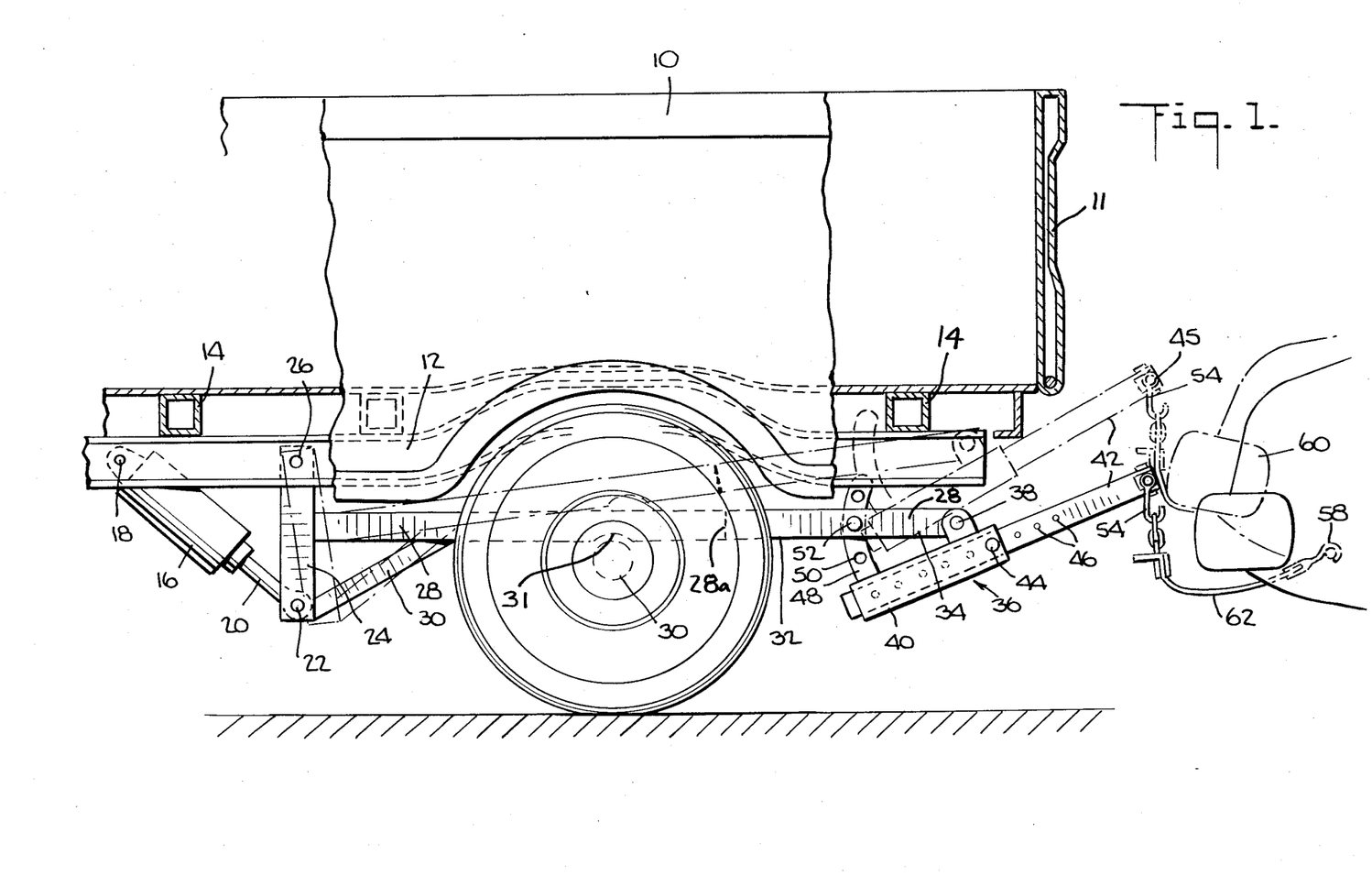
FIG. 1 is a cutaway side view of a first embodiment of the under-vehicle towing apparatus according to the present invention.
Figure 2:
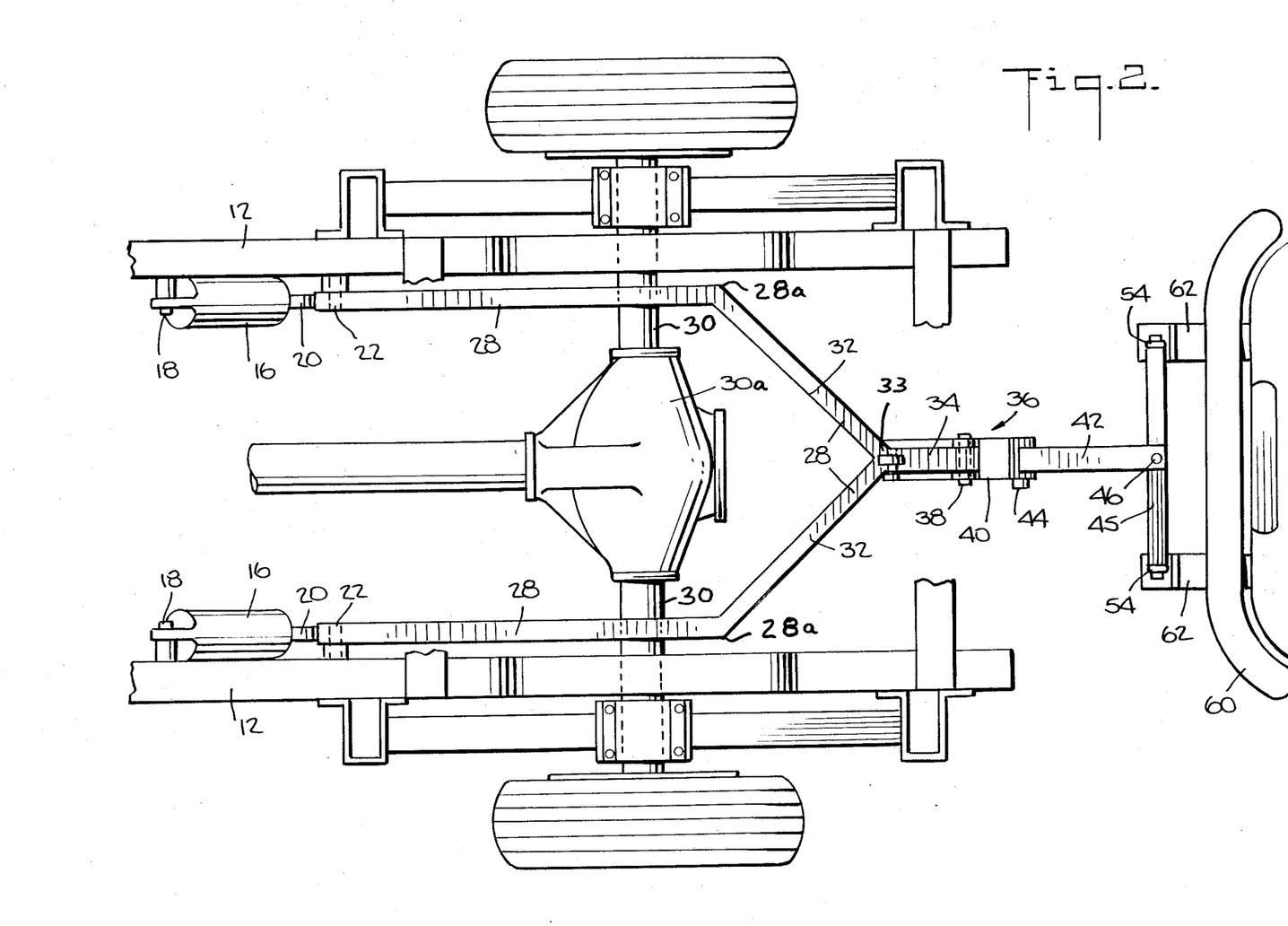
FIG. 2 is a top view of the under-vehicle towing apparatus shown in FIG. 1.

With reference now to the drawings, and in particular to FIGS. 1 and 2 thereof, the under vehicle towing apparatus according to the present invention can be provided below the body of a towing vehicle, for example, a conventional pick-up truck having a bed 10 with a tailgate 11. The bed 10 of the pick-up truck is mounted to a conventional frame 12, for example, via cross supports 14, or by any other suitable means, as well known. According to the invention, a force supplying means, such as a single hydraulic ram or, according to the preferred embodiment, a pair of hydraulic rams 16, are pivotably mounted to the chassis frame 12 of the towing vehicle at 18. The cylinder rod 20 of each of the hydraulic rams 16 is pivotably mounted at 22 to a first member 24 which is also pivotably mounted at the frame at 26. A boom member 28 is mounted to the member 24 by suitable means, for example, by bolting or by welding. A gusset or support member 30 may also be provided to strengthen the coupling of boom member 28 to member 24. Preferably, if two hydraulic rams 16 are utilized, two boom members 28 are provided which extend toward the rear axle 30 of the towing vehicle. After passing the rear axle of the towing vehicle, the two booms 28 are angled toward each other as shown by boom sections 32. The two sections 32 of the booms 28 are then joined at 33 to form a section 34. See FIG. 2 for more detail.

If one hydraulic ram is used instead, it can be mounted approximately along the longitudinal center line of the vehicle and a shaft coupled to the ram can be disposed between members 24 pivoted in each frame rail 12. Other arrangements, as apparent to a person of skill in the art, could also be utilized.

Controls for the hydraulic rams 16 may be located conveniently remotely therefrom, for example, in the bed of the towing vehicle. Hydraulic fluid pressure can be supplied by a suitable hydraulic pump, driven, for example, by the vehicle engine.

As shown in FIG. 1, when hydraulic rams 16 are in the retracted position, booms 28 approach the ground, i.e., they rest just above the rear axle 30 of the towing vehicle, as shown in the solid lines in FIG. 1. The conventional differential member is shown at 30a. Boom 30 may be provided with a suitable recess 31, if necessary, to clear the rear axle, and the rear axle may be provided with a suitable abutment member for supporting the boom 28 when in its down position. When hydraulic rams 16 are activated, member 24 is pivoted at pivot point 26, as shown by the phantom lines, and boom 28 is raised as shown in FIG. 1. This provides, for example, approximately one foot of vertical movement at the end of the boom 28.

According to the invention, in order to utilize most efficiently the vertical movement of the rearward end of boom 28, a telescoping member 36 is pivotably mounted at the end of boom 28 at 38. Telescoping member 36 includes a first outer member 40, for example, a cylindrical member or square section, and a second sliding inner section 42, which may have a circular cross section or be square in cross section, depending upon the structure of member 40. According to an embodiment of telescoping member 36, inner member 42 can be adjustably fixed to outer member 40 by a pin 44 disposed through one of a plurality of holes 46 in inner member 42. Outer member 40 includes one hole through which pin 44 is disposed.

At its lower end, outer telescopic member 40 has attached thereto a support member 48, which is welded or bolted to member 40. Member 48 may be arcuate in form, as shown in FIG. 1, and includes a plurality of apertures 50 disposed therein. Boom member 28 includes an aperture disposed therein for receiving a pin 52, which pin 52 fixes member 48 and thus fixes telescoping member 36 in one of a plurality of angular positions to boom member 28. Accordingly, the spacing of the lower end of outer telescopic member 40 from the boom 28 can be adjusted, thereby adjusting the rearward end of inner telescopic member 42 to the most desirable distance above the ground in order to accommodate the towed vehicle. Thus, by suitably positioning pin 52 in one of the plurality of apertures 50 in member 48 and pin 44 in one of the plurality of apertures 46 in telescopic member 42, the most desirable spacing above the ground in order most efficiently to utilize the full travel distance of the end of boom 28 may be obtained. It is anticipated that the disposition of pin 52 in one of apertures 50 need not be changed often, but that instead, the selection of a hole 46 through which pin 44 is inserted, thus adjusting not only the rearward extent of telescopic member 42 but the height of its end above the ground, will provide the most often needed adjustment in practice. A cross member 45 may be attached pivotably at 46 to inner telescopic member 42 to allow rotatable movement thereof and a hook 54 is suitably fastened at each of the ends of member 45. Conventional chains 56 and hooks 58 for attachment to the towed vehicle 60 may be provided. A suitable flexible protective member 62, such as reinforced rubber, as well known, may also be provided for protecting the underside of the vehicle. At the end of member 62, the hooks 58 engage the towed vehicle at suitable locations, for example, portions of the chassis or front suspension of the towed vehicle, as well known.

Figures 3, 4:
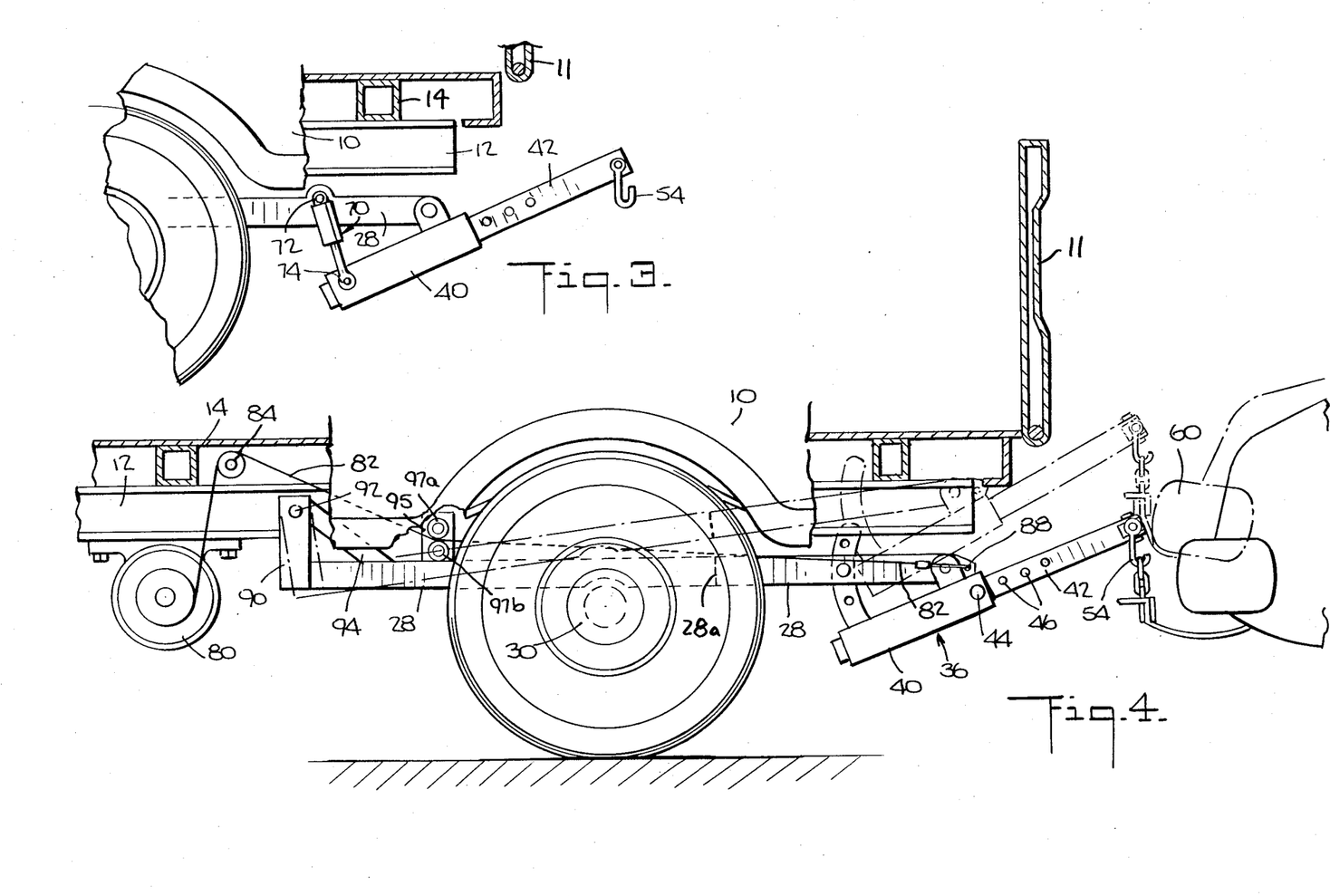
FIG. 3 is a side view of a portion of the under-vehicle towing apparatus according to the present invention showing a modification thereof.
FIG. 4 is a cutaway side view of a second embodiment of the under vehicle towing apparatus according to the present invention.

According to a further embodiment of the invention, as shown in FIG. 3, arcuate member 48 and pin 52 may be replaced by a further hydraulic ram arrangement 70. The hydraulic ram cylinder may be pivotably mounted to boom 28 at 72, and its cylinder rod may be pivotably mounted to outer telescopic member 40 at 74. The hydraulic ram may be conveniently actuated by suitable remotely located hydraulic controls, for example, disposed in the bed of the towing vehicle thus to adjust the distance of the end of inner telescopic member 42 above the ground. Hydraulic ram 70 can be used to increase the vertical movement above the ground of the rearward end of member 42, thus increasing the distance above the ground that a towed vehicle can be lifted.

According to a further embodiment of the invention shown in FIG. 4, wherein like reference numerals have been provided for like elements as in the other figures, instead of an hydraulic ram or plurality of hydraulic rams 16, a power take-off device 80 or electric winch suitably mounted to the frame rails 12 may be provided for raising booms 28. Device 80 may wind a suitable cable member 82 which travels rearwardly via guide pulley 84. A vertical member 95 is suitably fastened to boom 28 as shown and includes two roller bearings 97a and 97b for guiding cable 82. After passing roller bearings 97a and 97b, cable 82 extends rearwardly and is fastened to the rearward end of boom 28 at attachment point 88. Thus, cable 82 provides a torque to boom 28 to lift the boom via the vertical component of the tensile force in cable 82 exerted on upper roller bearing 97a. An advantage of this embodiment is that the end 88 of cable 82 may be provided with a suitable hook member, as shown, so that if necessary, the end 88 of cable 82 may be removed from the end of boom 28, and extended from the rear of the towing vehicle in order to provide winching capabilities, i.e., in order to winch a vehicle up an incline, for example. Boom 28 may be locked in its downward position by any suitable means when the cable is used for winching duty and the cable end is detached from the boom 28. As shown in FIG. 4, each boom 28 is mounted to a vertically extending member 90 which is pivotably mounted on frame 12 at 92. A suitable strengthening gusset 94 may be provided.

Figure 5:
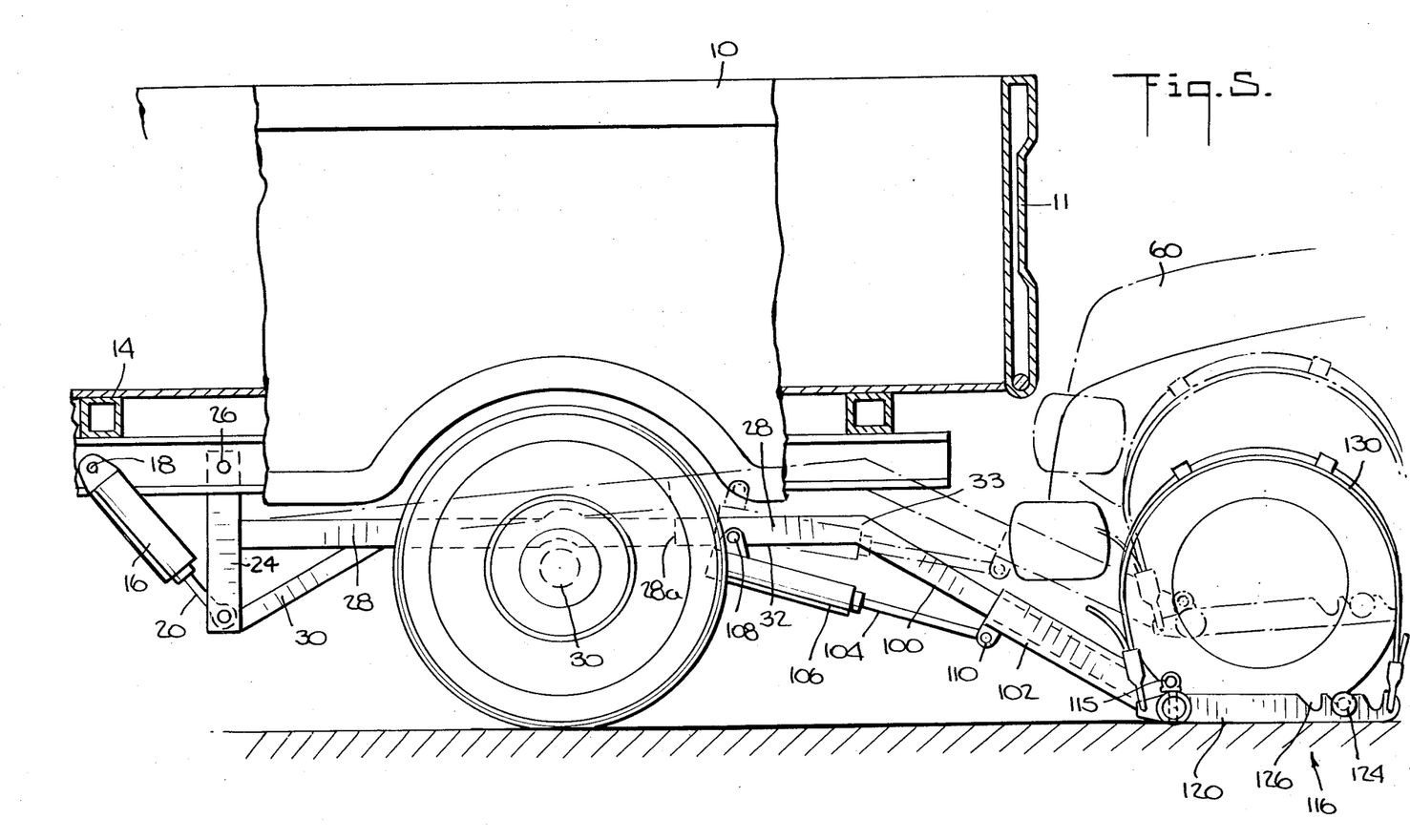
FIG. 5 is a side view of a further embodiment of the apparatus according to the invention.
Figures 6, 7:
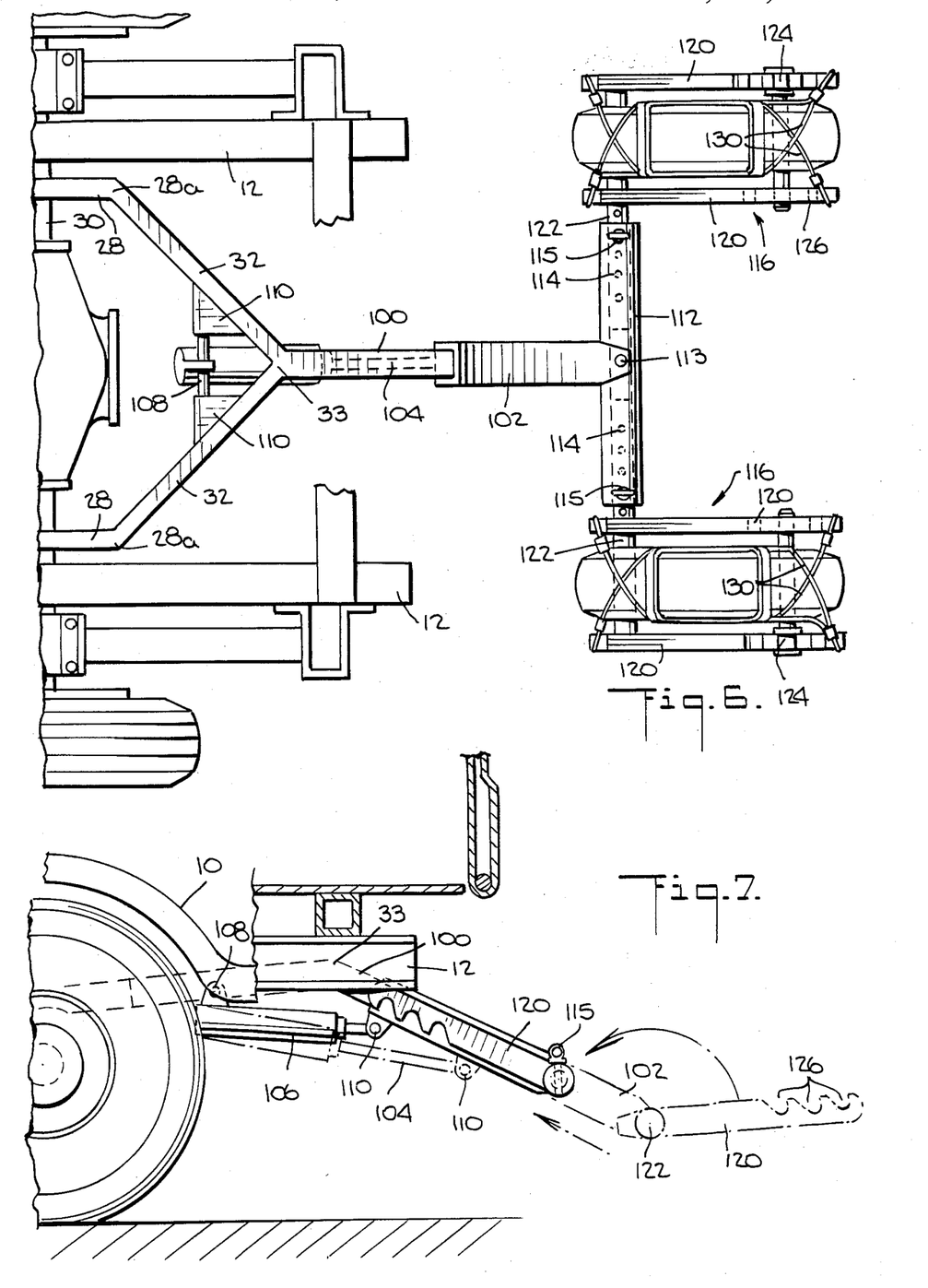
FIG. 6 is a top view of a portion of the apparatus of FIG. 5.
FIG. 7 is a side view of a portion of the apparatus of FIG. 5.

FIGS. 5 through 7 show an additional embodiment of the present invention. The embodiment shown in FIGS. 5 through 7 utilizes a type of towing apparatus adapted to engage a towed vehicle which is often called a "damage-free towing" apparatus, whereby the wheels of the towed vehicle are engaged instead of a portion of the chassis of the towed vehicle. In this embodiment, booms 28 are coupled to the hydraulic ram or rams 16, similarly to the apparatus shown in FIG. 1. In contrast to the embodiment of FIG. 1, booms 28, after they join at approximately 33 as shown in FIG. 5, extend downwardly as shown by section 100. Downwardly extending portion 100 forms an inner telescopic member for slidable movement of an outer telescopic member 102. Outer telescopic member 102 is connected to a cylinder rod 104 of an hydraulic cylinder 106. Hydraulic cylinder 106 is pivotably mounted to sections 32 of booms 28 at 108. Suitable gussets 110 are provided for establishing a mounting point for pivot point 108. Cylinder rod 104 is pivotably mounted to outer telescopic member 102 at 110. Outer telescopic member 102 is coupled to a cross member 112 via a suitable pivotable connection 113. A pair of inner telescopic members 122 are slidably disposed in outer member 112. Inner members 112 have a plurality of apertures 114 at the ends thereof to provide adjustment for the spacing between two wheel engaging members 116, which engage the wheels of a towed vehicle. A suitable pin member 115 may be provided for locking the spacing between the wheel engaging members 116.

Each wheel engaging member 116 includes a pair of bar members 120. Bar members 120 are spaced from each other a suitable distance to accommodate varying tire widths. Alternatively, bar members 120 may be spaced adjustably from each other to accommodate vehicle tires of different widths. In the embodiment shown in FIG. 6, bar members 120 are coupled together via the inner telescopic member 122 which is slidable within cross member 112. As indicated previously, inner telescopic member 122 includes a plurality of apertures 114 for adjusting the spacing between wheel engaging members 116.

The embodiment of FIGS. 5 through 7 is operated as follows. When hydraulic ram 16 is in its retracted position, booms 28 extend toward the ground. Hydraulic ram 106 is then actuated to extend outer telescopic member 102 toward the ground. As shown in FIG. 7, bar members 120 are pivotable on shafts 122 about a point 124 such that, when not in use, they can be stowed conveniently adjacent section 100. Preferably, when outer telescopic member 102 is retracted, and members 120 are pivoted about shafts 122, members 120 can be conveniently stowed adjacent section 100 beneath the bed of the vehicle, as shown in FIG. 7. Pins 115 may be removed in order to allow pivoting of bar members 120 on shaft 122 inside cross member 112. Pins 115 would then be reinserted into the holes in cross member 112 and in a special set of holes in shafts 122 which are drilled at the correct angle to support the wheel engaging members 116 in their stowed position. Other arrangements can also be provided to support members 116 in the stowed position, e.g., abutments coupled to section 100 of booms 28 or cross member 112.

Once hydraulic ram 16 has been retracted and boom member 28 extends toward the ground, hydraulic ram 106 is actuated, thus extending outer telescopic member 102 toward the ground along member 100. Bar members 120 are then pivoted on shaft 122 inside cross member 112 to the position shown in FIGS. 5 and 6. Bar members 120 are connected at their rearward ends by suitable pin members 124 which are disposed in one of a plurality of aligned grooves or apertures 126 in bar members 120. In order to lift a vehicle to be towed, pins 124 are removed from the grooves or apertures 126 in bar members 120, and the shafts 122 are adjusted to accommodate the spacing between the wheels of the vehicle to be towed. This is performed via pins 115 and apertures 114 in shafts 122. The towing vehicle is then backed up toward the vehicle to be towed, so that the bar members 120 extend along the sides of the vehicle wheels, as shown in FIG. 6. Once the front of the wheels make contact with shafts 122, pin 124 is placed in one of the grooves or aperature 126, thus providing support for the vehicle wheel when ram 16 is activated to lift boom 28. Suitable strap members 130 may be employed which are adapted to engage the perimeter of the wheels in order to hold the vehicle securely to the bar members 124.

As shown in FIG. 5, once the vehicle wheels have been suitably strapped to bar members 120, hydraulic ram 16 is activated, thus raising boom 28 and the vehicle 60.

According to the invention, an apparatus for towing vehicles has been provided which can be mounted completely beneath the towing vehicle, for example, the bed of a pick-up truck. The towing apparatus of the present invention leaves the body of the towing vehicle completely unobstructed. Thus, the bed of an ordinary pick-up truck can be utilized for conventional hauling, even when a vehicle is being towed. The apparatus of the present invention requires few modifications in order to be installed. When installed, some modification of the frame may be necessary in order to strengthen the frame, as for example, near pivot point 18 of rams 16 and pivot points 26 and 92 of members 24 and 90, respectively. Thus, it may be necessary to provide an additional cross member near these points. Furthermore, it may also be necessary to remove or modify the rear bumper of the tow vehicle to accommodate the apparatus of the present invention.

An advantage of the present invention over the known under-bed or under-vehicle towing devices is that the present invention provides much more even weight distribution than the known devices. In the known devices, as mentioned above, the towing apparatus is mounted behind the rear axle of the towing vehicle, thus providing a torque tending to lift the front end of the towing vehicle. In the present invention, due to the location of pivot point 26 or 92 of booms 28 much closer to the center of the vehicle, the weight of the towed vehicle is distributed more evenly to the front and rear suspensions, thus preventing the tendency of the front suspension of the towing vehicle to rise when a vehicle is towed. Furthermore, the location of the pivot point 26 or 92 near the center of the vehicle may eliminate the need to modify the rear suspension of the vehicle to support increased loads, as is often necessary in towing vehicles.

In the foregoing specification, the invention has been described with reference to exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus disposed beneath the body of a first motor vehicle adapted to lift a second motor vehicle at least partly from the ground whereby the first motor vehicle can tow the second motor vehicle, comprising:
   first arm means disposed below the body of the first motor vehicle and pivotable about a first pivot point disposed below the body on the frame of the first motor vehicle, said first motor vehicle having a front axle and a rear axle, said first pivot point being located between said front and rear axles substantially ahead of said rear axle, said first arm means extending toward the rear of said first motor vehicle and adapted to engage the second motor vehicle to be towed;
   force supplying means coupled to said first arm means and further coupled to said frame of said first motor vehicle for providing a force to said first arm means to move said first arm means about said first pivot point, thereby raising an end of said first arm means extending toward the rear of said first motor vehicle and distributing the weight of the second motor vehicle substantially toward the center of said first motor vehicle at said first pivot point, whereby said second motor vehicle when engaged by said first arm means will be at least partly lifted from the ground for towing said force supplying means and said coupling to said frame of said first motor vehicle being disposed forwardly of said rear axle and below said body of said first motor vehicle.

2. The apparatus recited in claim 1, further comprising second arm means disposed approximately vertically and coupled to said first arm means, said first rm means being coupled to said second arm means at approximately a right angle, said second arm means being pivotable about said first pivot point.

3. The apparatus recited in claim 1 wherein said first arm means comprises a pair of at least partly parallel disposed arm means, each of said pair of arm means being pivotable about a first pivot point disposed on a frame rail of said first motor vehicle.

4. The apparatus recited in claim 3 wherein said pair of arm means are angled toward each other rearwardly of the rear axle of said first motor vehicle.

5. The apparatus recited in claim 2, further comprising third arm means extending rearwardly of said first motor vehicle and pivotably mounted at the rearward end of said first arm means and having an end thereof adapted to engage said second motor vehicle.

6. The apparatus recited in claim 5, wherein said third arm means further comprises means allowing adjustment of an angle between the longitudinal direction of said first arm means and said third arm means.

7. The apparatus recited in claim 6 wherein said adjusting means comprises an upwardly extending arm coupled to said third arm means and further coupled to said first arm means.

8. The apparatus recited in claim 7, wherein said upwardly extending arm includes a plurality of apertures therein at spaced intervals and said first arm means includes an aperture, said aperture of said first arm means and at least one of the apertures of said upwardly extending arm adapted to receive a pin for adjustably fixing the angle between said first arm means and said third arm means.

9. The apparatus recited in claim 6 wherein said adjusting means comprises further hydraulic ram means.

10. The apparatus recited in claim 5 wherein said third arm means comprises telescopic means comprising an outer fixed member and an inner movable member extendable rearwardly of said first motor vehicle.

11. The apparatus recited in claim 10, further comprising means for adjustably fixing the rearward extent of said inner telescopic member.

12. The apparatus recited in claim 3 wherein said force supplying means comprises a pair of force supplying means, one coupled to each of said parallel disposed first arm means.

13. The apparatus recited in claim 1 wherein said force supplying means comprises hydraulic ram means.

14. The apparatus recited in claim 12 wherein said pair of force supplying means each comprise hydraulic ram means.

15. The apparatus recited in claim 1 wherein said force supplying means comprises means driven directly or indirectly by the engine of said first motor vehicle.

16. The apparatus recited in claim 15 wherein said force supplying means comprises power take-off means driven by said engine.

17. The apparatus recited in claim 1 wherein said force supplying means comprises electrically driven winch means.

18. The apparatus recited in claim 15 wherein said force supplying means is coupled to a cable extending toward the rear of said first motor vehicle and having a portion coupled to said first arm means for raising and lowering said first arm means.

19. The apparatus recited in claim 18, wherein said first arm means comprises an aperture through which said cable is disposed prior to attachment to said first arm means whereby when said cable is under tension, a force is exerted on said first arm means at said aperture to raise said first arm means.

20. The apparatus recited in claim 19 wherein an end of said cable is removably secured to said first arm means whereby said end of said cable can be extended rearwardly of said first motor vehicle for winching a second motor vehicle.

21. The apparatus recited in claim 19 wherein said aperture comprises bearing means for said cable.

22. The apparatus recited in claim 21 wherein said bearing means comprises roller bearing means.

23. The apparatus recited in claim 1, wherein said first arm means comprises arm means directed toward the ground rearwardly of said rear axle, and further comprising further arm means adapted to engage at least one wheel of said second motor vehicle for lifting said second motor vehicle at least partly from the ground.

24. The apparatus recited in claim 23 wherein said further arm means comprises two pairs of parallel bar means, each pair of said bar means adapted to straddle the sides of a wheel of said second motor vehicle.

25. The apparatus recited in claim 24 wherein said bar means each include a pair of aligned aperture means, a pin being disposed in the aligned aperture means in each of said bar means adapted to engage the wheel of said second motor vehicle.

26. The apparatus recited in claim 25, further comprising strap means coupled to said bar means engaging at least part of the periphery of said wheels of said second motor vehicle for securely fastening said wheels to said bar means.

27. The apparatus recited in claim 25 wherein each of said pairs of bar means are collapsible for disposition adjacent said first arm means below said first motor vehicle.

28. The apparatus recited in claim 23, further comprising means slidably disposed on a portion of said first arm means directed toward the ground and further force supplying means for moving said slidable means on said portion where said further arm means can be extended rearwardly of said first motor vehicle to engage said wheel of said second motor vehicle.

29. The apparatus recited in claim 28, wherein said further force supplying means comprises hydraulic ram means disposed between said slidable means and said first arm means.

30. Apparatus disposed beneath the body of a first motor vehicle adapted to lift a second motor vehicle at lest partly from the ground whereby the first motor vehicle can tow the second motor vehicle, comprising:
first arm means disposed below the body of the first motor vehicle and supportably coupled to said body at a first point disposed below the body on the frame of the first motor vehicle, said first motor vehicle having a front axle and a rear axle, said first point being located between said front and rear axles substantially ahead of said rear axle, the first arm means extending toward the rear of said first motor vehicle and being supportably connected to said body only at said first point;
additional arm means extending rearwardly of said first motor vehicle and pivotably mounted at the rearward end of said first arm means and having an end thereof adapted to engage said second motor vehicle;
force supplying means disposed below the first motor vehicle coupled to said first arm means and further coupled to said additional arm means for providing a force to said additional arm means to move said additional arm means about a pivot point on said first arm means, thereby raising said end of said additional arm means extending toward the rear of said first motor vehicle, the weight of the second motor vehicle being substantially distributed by said first arm means toward the center of said first motor vehicle at said first point, whereby said second motor vehicle when engaged by said first arm means will be at least partly lifted from the ground for towing.

31. The apparatus recited in claim 30, wherein said first arm means comprises a pair of at least partly parallel disposed arm means, each of said pair of arm means being coupled to the frame of said first motor vehicle at a first point.

32. The apparatus recited tin claim 31, wherein said pair of arm means are angled toward each other rearwardly of the rear axle of said first motor vehicle.

33. The apparatus recited in claim 30, wherein said force supplying means comprises a means for adjusting an angle between the longitudinal direction of said first arm means and said additional arm means.

34. The apparatus recited in claim 33, wherein said adjusting means comprises hydraulic ram means.

35. The apparatus recited in claim 30, wherein said additional arm means comprises telescopic means comprising an outer fixed member and an inner movable member extendable rearwardly of said first motor vehicle.

36. The apparatus recited in claim 35, further comprising means for adjustably fixing the rearward extent of said inner telescopic member.

37. The apparatus recited in claim 30, wherein said first point is a pivot point and further comprising a second force supplying means disposed below the first motor vehicle coupled to said first arm means and further coupled to said frame of said first motor vehicle for providing a force to said first arm means to move said first arm means about said first point, thereby raising the end of said first arm means extending toward the rear of said first motor vehicle.

* * * * *